(12) United States Patent
Gerraty

(10) Patent No.: US 7,483,965 B1
(45) Date of Patent: *Jan. 27, 2009

(54) GENERATION OF A CONFIGURATION PATCH FOR NETWORK DEVICES

(75) Inventor: Simon J. Gerraty, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 703 days.

This patent is subject to a terminal disclaimer.

(21) Appl. No.: 10/339,719

(22) Filed: Jan. 9, 2003

Related U.S. Application Data

(63) Continuation-in-part of application No. 10/223,813, filed on Aug. 19, 2002.

(51) Int. Cl.
*G06F 15/177* (2006.01)

(52) U.S. Cl. .................. 709/221; 709/217; 709/220; 707/8; 707/200; 707/201

(58) Field of Classification Search ......... 709/217–222; 707/1, 8–9, 200–201
See application file for complete search history.

(56) References Cited

U.S. PATENT DOCUMENTS

| | | | | |
|---|---|---|---|---|
| 5,497,316 | A | * 3/1996 | Sierk et al. | ................. 700/11 |
| 5,517,646 | A | * 5/1996 | Piccirillo et al. | ............. 713/1 |
| 5,600,262 | A | * 2/1997 | Kolze | ...................... 326/38 |
| 5,835,501 | A | * 11/1998 | Dalmia et al. | ............. 714/704 |
| 5,835,601 | A | * 11/1998 | Shimbo et al. | ............. 713/165 |
| 6,014,669 | A | 1/2000 | Slaughter et al. | |
| 6,141,759 | A | 10/2000 | Braddy | |
| 6,240,414 | B1 | 5/2001 | Beizer et al. | |
| 6,393,419 | B1 | * 5/2002 | Novak et al. | ................ 707/8 |
| 6,480,955 | B1 | 11/2002 | DeKoning et al. | |
| 6,529,905 | B1 | 3/2003 | Bray et al. | |
| 6,587,124 | B1 | * 7/2003 | Slaby | ...................... 715/735 |
| 6,671,699 | B1 | 12/2003 | Black et al. | |
| 6,907,603 | B2 | 6/2005 | Scott | |
| 6,996,372 | B2 | 2/2006 | Noerpel et al. | |
| 6,996,672 | B2 | * 2/2006 | Lubbers et al. | ............. 711/114 |
| 7,043,537 | B1 | 5/2006 | Pratt | |

(Continued)

OTHER PUBLICATIONS

U.S. Appl. No. 10/222,813, entitled "Private Configuration of Network Device," filed Aug. 19, 2002.

(Continued)

*Primary Examiner*—William C Vaughn, Jr.
*Assistant Examiner*—Mohamed Ibrahim
(74) *Attorney, Agent, or Firm*—Shumaker & Sieffert, P.A

(57) ABSTRACT

A network device includes an initial data source to store configuration data for the network device, and a management module to generate a configuration patch that lists any differences between a working copy of the initial data source and the initial data source. The management module modifies the working copy based on configuration commands received from a client, and updates the initial data source in accordance with the differences defined by the configuration patch. During the update process, the management module verifies that any conditions specified by the patch are satisfied. The management module may generate the configuration patch in response to a first command from a client, and apply the patch in response to a second command from the client. The configuration patch may be communicated to other network devices for configuring the devices.

33 Claims, 9 Drawing Sheets

U.S. PATENT DOCUMENTS

| | | | |
|---|---|---|---|
| 7,055,148 | B2 | 5/2006 | Marsh et al. |
| 7,065,637 | B1 | 6/2006 | Nanja |
| 7,130,870 | B1 | 10/2006 | Pecina et al. |
| 2002/0161860 | A1 | 10/2002 | Godlin et al. |
| 2002/0162049 | A1 | 10/2002 | Takamoto et al. |
| 2002/0194015 | A1 | 12/2002 | Gordon et al. |
| 2003/0037040 | A1 | 2/2003 | Beadles |
| 2003/0212983 | A1 | 11/2003 | Tinker |
| 2003/0225866 | A1 | 12/2003 | Hudson |
| 2004/0032837 | A1 | 2/2004 | Visser |
| 2005/0114315 | A1 | 5/2005 | Tanner et al. |
| 2005/0138375 | A1 | 6/2005 | Sadjadi |
| 2006/0168160 | A1 | 7/2006 | Pratt |

OTHER PUBLICATIONS

U.S. Appl. No. 10/392,201, entitled "Application of a Configuration Patch to a Network," filed Mar. 17, 2003.

Office Action dated Mar. 24, 2006 for U.S. Appl. No. 10/223,813, 19 pgs.

Response dated Jun. 26, 2006 for U.S. Appl. No. 10/223,813, 10 pgs.

Office Action dated Sep. 20, 2006 for U.S. Appl. No. 10/223,813, 25 pgs.

Amendment dated Dec. 20, 2006 for U.S. Appl. No. 10/223,813, 17 pgs.

Notice of Allowance dated Mar. 28, 2007 for U.S. Appl. No. 10/223,813, 13 pgs.

Office Action dated Oct. 4, 2006 for U.S. Appl. No. 10/392,201, 26 pgs.

Amendment dated Feb. 5, 2007 for U.S. Appl. No. 10/392,201, 12 pgs.

Office Action dated May 1, 2007 for U.S. Appl. No. 10/392,201, 25 pgs.

Amendment dated Aug. 1, 2007 for U.S. Appl. No. 10/392,201, 14 pgs.

Office Action dated Feb. 19, 2008 for U.S. Appl. No. 10/392,201, 26 pgs.

Amendment dated Jun. 19, 2008 for U.S. Appl. No. 10/392,201, 18 pgs.

* cited by examiner

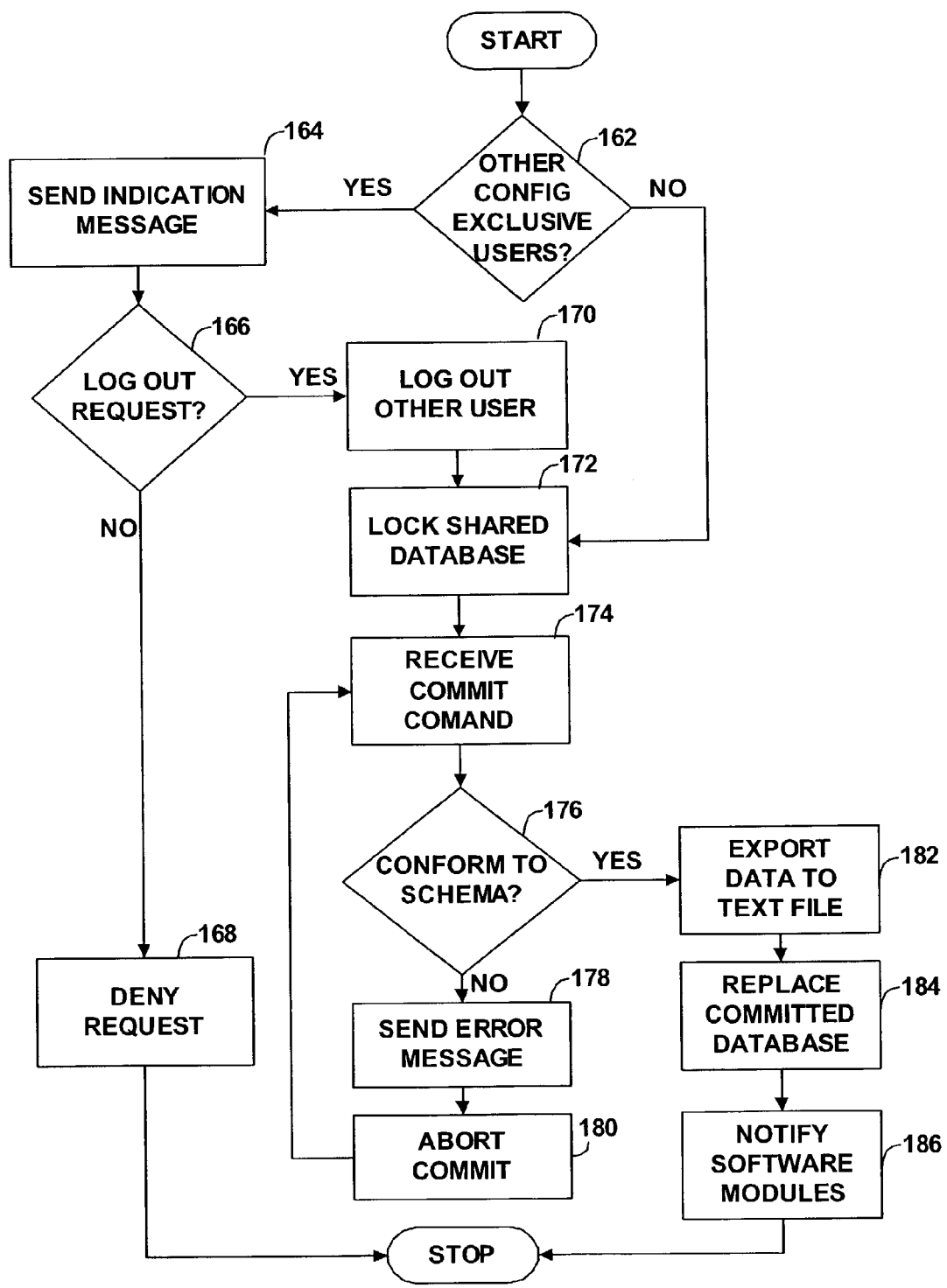

GENERATION OF A CONFIGURATION PATCH FOR NETWORK DEVICES

This application is a Continuation-in-part of U.S. application Ser. No. 10/223,813, filed Aug. 19, 2002, the entire content of which is incorporated herein by reference.

TECHNICAL FIELD

The invention relates to computer networks, and more particularly, to configuring devices within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within the network, referred to as routers, maintain tables of routing information that describe available routes through the network. Each route defines a path between two locations on the network. Upon receiving an incoming data packet, the router examines header information within the packet to identify the destination for the packet. Based on the header information, the router accesses the routing table, selects an appropriate route for the packet and forwards the packet accordingly.

Conventional routers typically include a mechanism, referred to herein as a management interface, for directly or remotely configuring the router. By interacting with the management interface, various clients, such as human users and automated scripts, can perform a vast amount of configuration tasks. For example, the clients may configure interface cards of the router, adjust parameters for the supported network protocols, specify the physical components within the routing device, modify the routing information maintained by the router, access software modules and other resources residing on the router, and the like.

In some routers, the management interface allows a client to configure the present configuration of the router using a commit-based model. In a commit-based model, a client issues one or more configuration commands, and then directs the management interface to apply the commands by issuing a "commit" command. Typically, the client may direct the management interface to disregard the commands by issuing a "rollback" command.

For example, a client typically places the router in a configuration mode, often by issuing an edit command to the management interface. In this mode, the management interface may essentially "lock" the router, and reject any configuration commands from other clients. Next, the client typically issues a number of commands directing the management interface to modify the present configuration, followed by a commit command that directs the router to apply the commands. Upon receiving the commit command, the management interface exits the configuration mode, and applies the changes to the present configuration, thereby adjusting the operation of the router. Finally, the management interface exits the configuration mode, effectively "unlocking" the router and allowing configuration by another client.

As the complexity of computing networks has increased, there has been an increasing need for routers and other network devices to support concurrent configuration by multiple clients. Consequently, some devices allow multiple clients to concurrently issue configuration commands. In other words, the management interface of such a device does not "lock" the configuration of the device to a single client, but receives configuration commands from multiple clients while operating in configuration mode. When the management interface receives a commit command from any of the clients providing commands, the management interface applies all of the pending changes from all of the concurrent clients to the present configuration. These techniques can be problematic in that partial changes made by a client may be committed in response to a commit command from another client. Furthermore, uncommitted changes made by a client may be lost when another client issues a "rollback" command.

SUMMARY

In general, the invention is directed to techniques for allowing multiple clients to concurrently configure a network device. In particular, the clients can concurrently issue configuration commands to the network device, without the risk of having those partially completed modifications committed by another client or having the commands lost due to a rollback command from another client.

Consistent with the principles of the invention, a management module of the network device supports a command syntax in which a configure command may optionally specify a particular configuration mode. More specifically, the configure command may include an additional parameter that specifies an exclusive mode or private mode. Upon receiving a configure exclusive command, the management module locks the network device and allows a single client to make changes to the present configuration.

In response to a configure private command, the management module places the device into a private configuration mode in which the client can issue configuration commands to the device. The management module does not lock the device, and allows other clients to concurrently issue configuration commands in a similar private configuration mode.

In particular, for each client that issues a configure private command, the management module creates a respective private data source, also referred to herein as a "working copy," from a committed data source that stores the present configuration of the device. The management module applies configuration commands from the clients to their respective private data sources. Upon receiving a commit command from a client, the management module merges the committed data source into a temporary copy of the private data source to generate a "configuration patch." The patch represents the changes to the private data source, i.e., the differences between the private data source and the committed data source.

The management module may also generate a configuration patch in response to a show|compare command received from the client. Use of the show|compare command is not limited to use within the private configuration mode. In a general sense, the show|compare command may be used to generate a configuration patch that lists the differences between an initial data source and a working copy of the initial data source. Upon receiving a show|compare command, the management module creates a temporary copy of the working copy, and merges the initial data source into the working copy to generate the patch. In this manner, the show|compare command may be used with a shared data source within the network device editable by multiple clients, or with a private data source editable by a corresponding client in a private configuration mode.

The management module "applies" the patch to update the initial data source, either automatically in response to the commit command or in response to a load patch command received from the client, to reconcile the initial data source with the working copy. In one embodiment, the management module makes a temporary copy of the initial data source, and loads the patch into the temporary copy. If the load is successful, the management module replaces the initial data source with the temporary copy. When applying the patch, the management module resolves any conflicts that may exist between the working copy and any changes to the initial data source made by other users.

In one embodiment, a method comprises creating a working copy of an initial data source that stores configuration data for the network device, and modifying the working copy based on configuration commands received from a client. The method further comprises generating a configuration patch that lists any differences between the working copy and the initial data source.

In another embodiment, a network device comprises an initial data source to store configuration data for the network device, and a management module to generate a configuration patch that lists any differences between a working copy of the initial data source and the initial data source.

In another embodiment, a computer-readable medium comprising instructions to cause a processor to create a working copy of an initial data source that stores configuration data for the network device, modify the working copy based on configuration commands received from a client, and generate a configuration patch that lists any differences between the working copy and the initial data source.

The invention may provide one or more advantages. For example, the management module of the network device supports a flexible command syntax in which a client may optionally specify one of a number of different configuration modes. The client may elect to configure the network device to the exclusion of others. Alternatively, the client may elect to configure the device in a private mode in which multiple clients can concurrently configure edit respective private data sources. Consequently, the client may edit the private data source without risk of premature commitment of the changes, or loss of the changes, due to another client.

In addition, by supporting the show|compare and load patch command, system administrator or other client can generate a configuration patch based on the differences between an initial data source and a working copy of the data source, and apply the patch to one or more network devices. In other words, these commands allow for a creation and distribution of a configuration patch from a single network device to other network devices.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 9 is a flowchart illustrating a management module operating in an exclusive configure mode in response to receiving a configure exclusive command.

DETAILED DESCRIPTION

Figure 1:
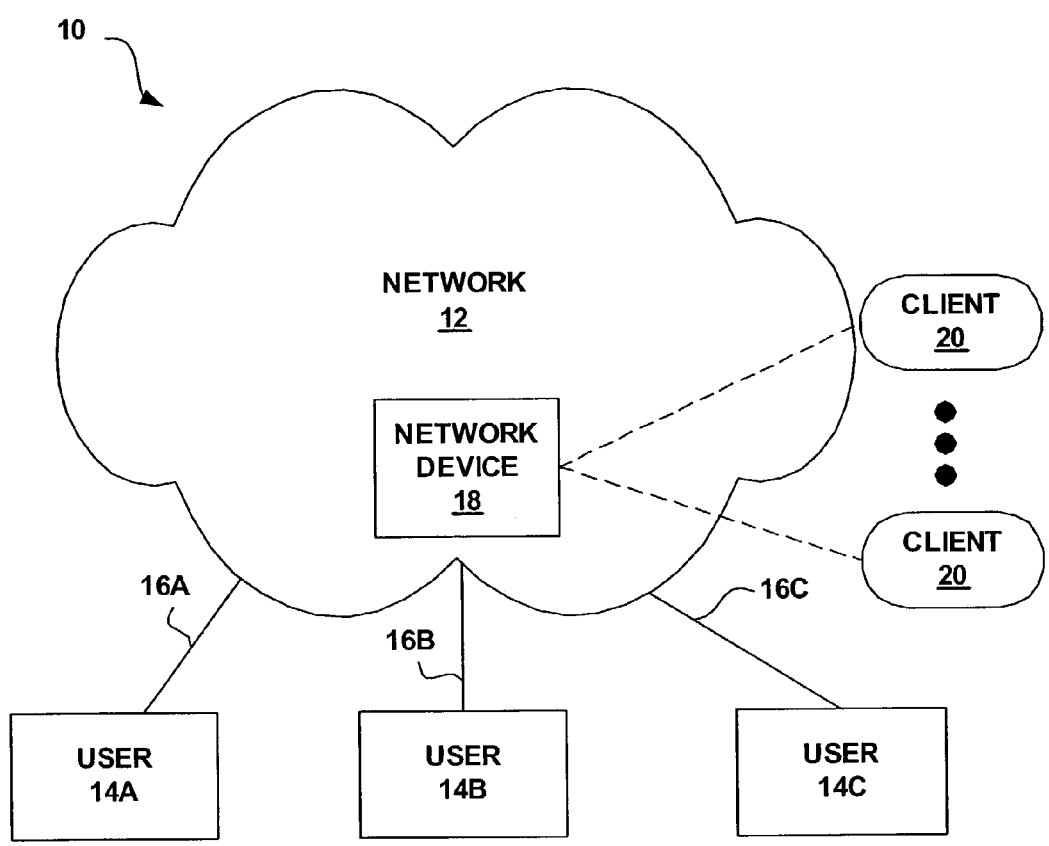
FIG. 1 is a block diagram illustrating an example computer network having a network device that supports a private configuration mode consistent with the principles of the invention.

FIG. 1 is a block diagram illustrating an example computer network 10 in which network device 18 supports a private configuration mode consistent with the principles of the invention. Computer network 10 comprises a network 12 that may be accessed by users 14A to 14C (collectively users 14) via one of links 16A to 16C (collectively links 16). Each of users 14 represents an entity, such as an individual or an organization, that accesses network 12 to communicate with other users connected to network 12. Links 16 may be Ethernet or other network connections.

Network device 18 represents any device operating within computing network 10, such as a network hub, network switch, network router, or the like. Network device 18 may include an interface that allows various clients 20, such as human users and automated scripts, to configure network device 18 by specifying protocols to follow, physical arrangements of hardware, or the like. For example, network device 18 may be a network router, and clients 20 may specify configuration information to configure interface cards of the router, adjust parameters for the supported network protocols, specify the physical components within the routing device, modify the routing information maintained by the router, access software modules and other resources residing on the router, and the like.

As described in detail, network device 18 supports a command syntax in which a configure command may optionally specify a particular configuration mode. More specifically, the configure command may include an additional parameter that specifies an exclusive mode or a private mode. Upon receiving a configure exclusive command from one of clients 20, network device 18 locks the primary configuration, and only allows the requesting client to make changes to the present configuration.

In response to a configure private command from one of clients 20, network device 18 enters a private configuration mode in which multiple clients 20 can issue configuration commands to device 18. In particular, for each of clients 20 that issues a configure private command, network device 18 creates a respective private data source from a committed data source that stores the present configuration of the device. In this manner, network device 18 creates a working copy of the committed data source for each client.

Network device 18 applies configuration commands from clients 20 to their respective private data sources. Upon receiving a commit command from any given one of clients 20, network device 18 generates a "configuration patch" by merging the committed data source into a temporary copy of the edited private data source. Moreover, network device 20 generates the patch to represent the changes to the private data source, and updates the committed data source based on the changes. In particular, network device 20 applies the patch to a copy of the committed data source, and replaces the committed data source if the application is successful. As described below, network device 18 supports a show|compare command for generation of a configuration patch.

When applying the patch, network device 20 resolves any conflicts that may exist between the private data source being committed and any changes to the committed data source made by other clients 20 while the private data source was being edited. If one of clients 20 issues a rollback command when in private configuration mode, only the respective private data source created for the client is discarded and refreshed. Consequently, clients 20 may edit the private data source without risk of premature commitment of the changes, or loss of the changes, due to another one of clients 20.

Figure 2:
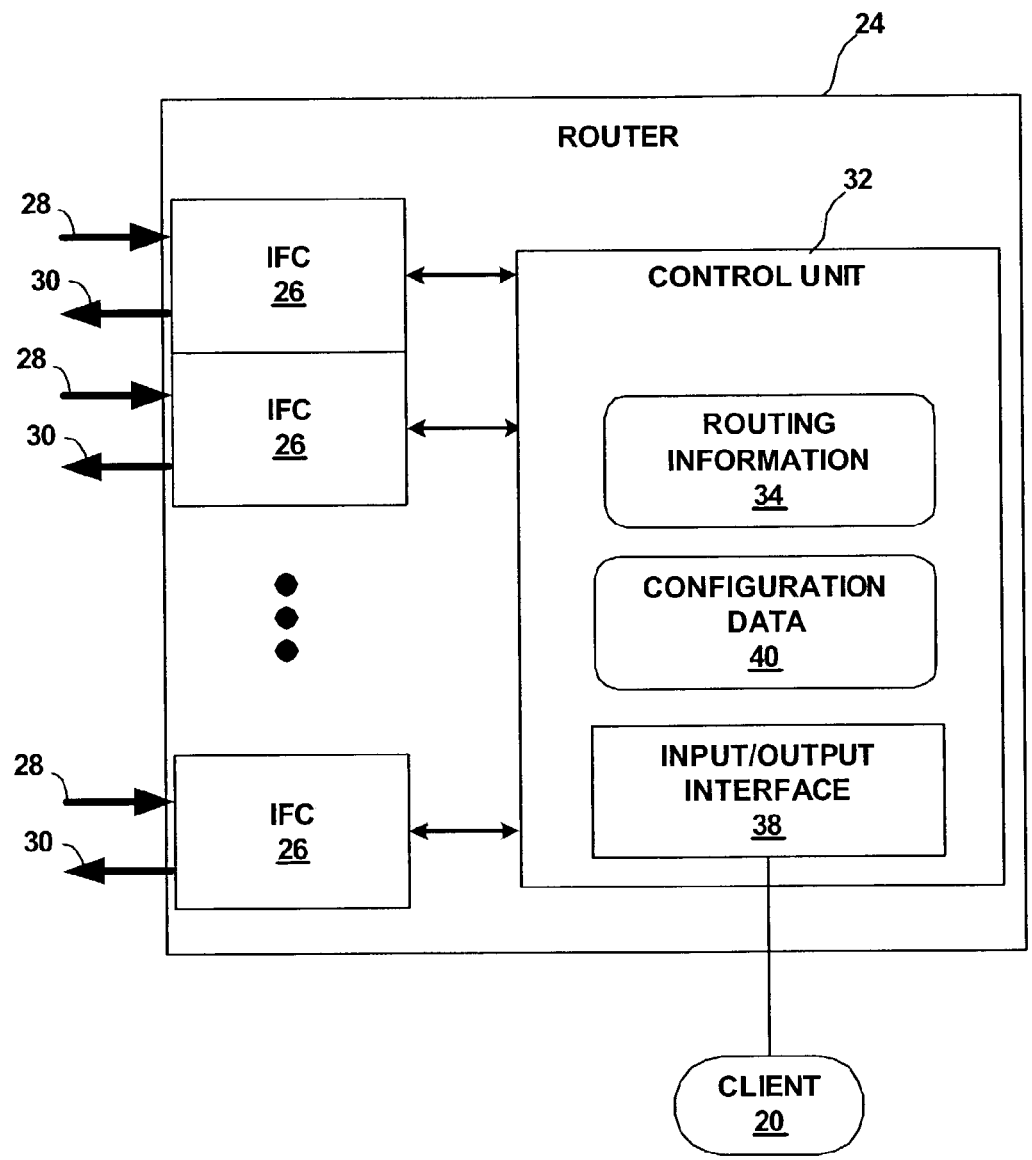
FIG. 2 is a block diagram illustrating an example network router that supports a private configuration mode consistent with the principles of the invention.

FIG. 2 is a block diagram illustrating an example network router 24 that supports a private configuration mode consistent with the principles of the invention. Router 24 includes a set of one or more interface cards (IFCs) 26 that receive and send packets via network links 28 and 30, respectively. IFCs 26 are typically coupled to network links 28, 30 via one or more interface ports.

Router 24 further comprises a control unit 32 that maintains routing information 34. Routing information 34 describes the topology of network 12 and, in particular, routes through network 12. Routing information 34 may include, for example, route data that describes various routes within network 12, and corresponding next hop data indicating appropriate neighboring devices within network 12 for each of the routes. Routing information 34 is periodically updated to accurately reflect the topology of network 12. In general, router 24 receives a packet via inbound network link 28, control unit 32 determines the destination address of the packet and outputs the packet on an outbound network link 30 based on the destination.

Control unit 32 may receive configuration input from a client 20 via an input/output (I/O) interface 38. I/O interface 38 may be a command line interface (CLI) or other suitable interface, for processing user or script-driven commands. Control unit 32 may store the configuration input received from client 20 as configuration data 40, which may take the form of a text file, such as an ASCII file. Alternatively, control unit 32 may process the configuration input and generate configuration data 40 in any one of a number of forms, such as one or more databases, tables, data structures, or the like.

In response to receiving a configure command, a management module of router 24 may parse the command, and place router 24 in a configuration mode for receiving configuration data 40 from client 20. Configuration data 40 may take the form of one or more commands for adding new settings to the current configuration of the router, commands for deleting or modifying existing settings of the current configuration, or combinations thereof. Router 24 may further parse configuration data 40, input from client 20, and resolve the references to appropriately configure router 24. Upon receiving a commit command, the management module applies configuration data 40 to router 24.

In this manner, a syntax for the configuration command may be expressed as follows:

configure [configuration mode], where configuration mode may specify private or exclusive, and is optional.

The following pseudocode illustrates an exemplary use of a configure command in accordance with the invention:

user@host> configure private
user@host# set system host-name router_25
user@host# commit In the above pseudocode client 20 issues a configure private command directing router 24 to enter a configuration mode and, more particularly, to enter a private configuration mode. While in the private configuration mode, client 20 then issues a command to modify the current host name of router 24, i.e., set system host-name. Finally, client 20 issues a commit command directing router 24 to verify and accept the changes.

Figure 3:
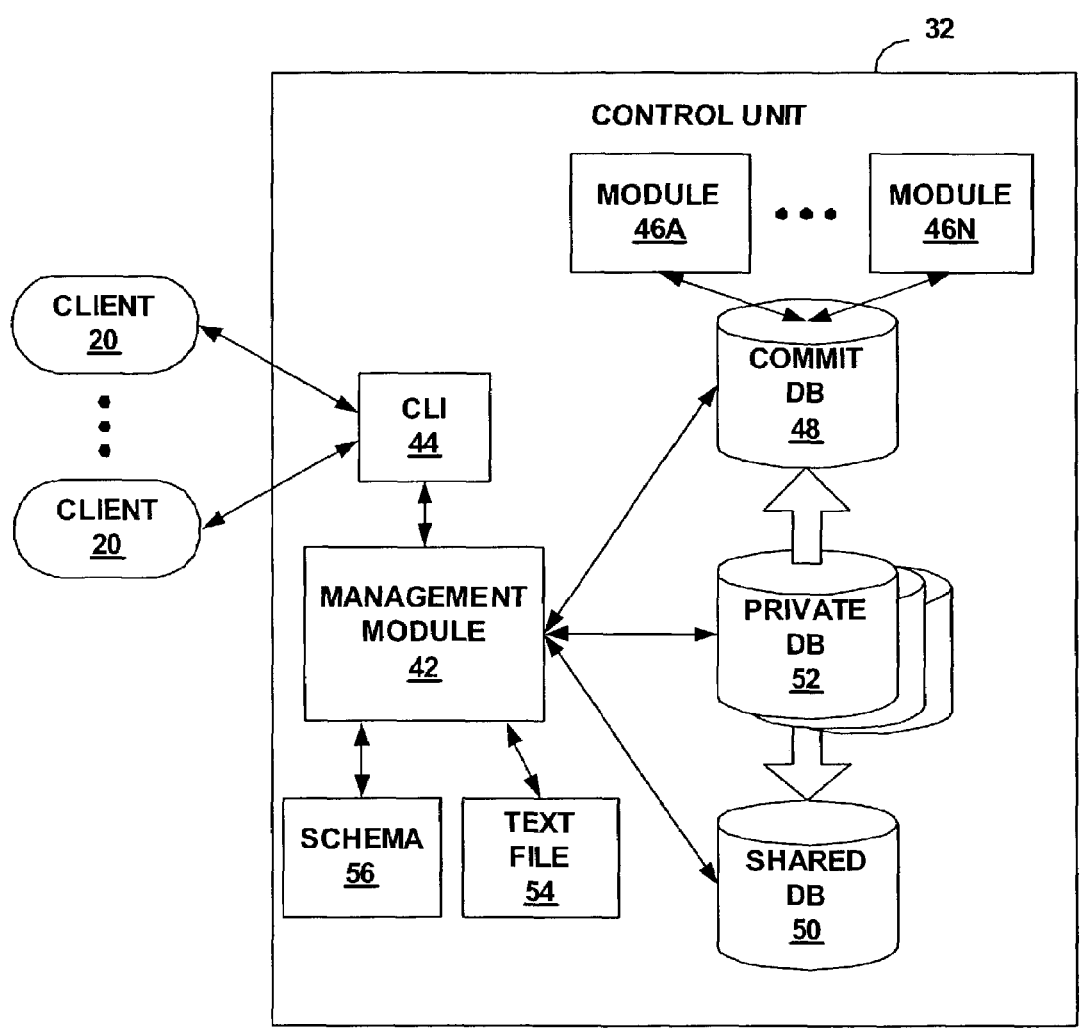
FIG. 3 is a block diagram illustrating an example control unit that supports operation in a private configure mode consistent with the principles of the invention.

FIG. 3 is a block diagram illustrating an example control unit 32 that supports operation in a private configure mode consistent with the principles of the invention. Control unit 32 comprises a management module 42 that communicates with one or more of clients 20 via a command line interface (CLI) 44. CLI 44 serves as a daemon process that listens for requests from clients 20. Upon receiving a request from one of clients 20, CLI 44 may relay the request to management module 42. However, CLI 44 may give way to direct communication between client 20 and management module 42.

Control unit 32 may further include one or more software modules 46A to 46N, collectively referred to as software modules 46. Software modules 46 represent threads of execution, and typically execute within an operating environment provided by an operating system. Software modules 46 may, for example, include a routing protocol module to administer protocols supported by router 24, a chassis module to account for the physical components of router 24, a device configuration module to control the physical configuration of router 24 or the like.

Control unit 32 may include a committed data source, referred to as committed database (COMMIT DB) 48, that stores a present configuration of router 24. In other words, router 24 operates in accordance with configuration information stored in committed database 48. Control unit 32 may further include a shared data source referred to as shared database (SHARED DB) 50, that contains a copy of the configuration data of committed database 48, and is typically used for editing the configuration without impacting operation of router 24. For example, clients 20 may access shared database 50 simultaneously and each of clients 20 may make changes to the configuration data stored in shared database 50.

Management module 42 may receive a command from one of clients 20 to configure router 24. Management module 42 may parse the command from client 20, and place router 24 in the configure mode requested by client 20. Router 24 may be configured using one of several different configuration modes, such as a default configuration mode (referred to as configure mode), an exclusive configuration mode, a private configuration mode, or the like.

By issuing a configuration command without specifying a configuration mode, management module 42 operates in the default configuration mode and allows clients 20 to concurrently edit configuration data in shared database 50. If one of clients 20 issues a commit command, all of the changes, complete or incomplete, made by clients 20 may be committed to committed database 48.

In exclusive configuration mode, management module 42 allows one of clients 20 to edit configuration data of shared database 50. However, when configuring in exclusive configuration mode, shared database 50 may be locked, allowing for only one client 20 at a time to edit configuration data of shared database 50. The lock may further prevent client 20 from creating any interference from other clients 20 when issuing a commit or rollback command. When receiving a commit command from the client 20 for which an exclusive lock has been granted, management module 42 copies shared database 50 to the committed database 48.

In private configuration mode, management module 42 allows clients 20 to edit configuration data in respective private data sources, referred to as private databases (PRIVATE DB) 52. For each of clients 20 that issue a configure private command, management module 42 creates a respective private database 52, each of which represent a copy of committed database 48 created at the time the management module 42 receives the corresponding configure command. In addition, management module 42 may generate a copy of a configuration text file 54, such as an ASCII configuration file that represents an authoritative version of the committed configuration, and that may contain configuration data that is used by control unit 32 during restart. Upon receiving a commit command from any given one of clients 20, management module 42 generates a patch by comparing changes made to private database 52 with the configuration data of text file 54. Management module applies the patch into committed database 48, and resolves any conflicts that may exist between private database 52 being committed and any changes to the committed database 48 made by other clients 20 while the private database was being edited.

Independent of the configuration mode entered by client 20, upon issuing a commit command, management module 42 validates the updated configuration. In one example, management module 42 determines whether the configuration data conforms to a schema 56 of the committed database. More specifically, schema 56 may be used to determine whether the configuration data is semantically valid. In addition, management module 42 may direct software modules 46 to validate specific parameters or settings within the updated configuration data.

Based on the validation, management module 42 may either reject the pending configuration data, or accept the pending configuration data. For example, management module 42 may accept the pending configuration data, and update the configuration data of committed database 48 to reflect the changes made by client 20. Management module 42 may then proceed to notify software modules 46 that committed database 48 contains updated configuration information. Software modules 46 may retrieve the new configuration data from committed database 48, and router 24 may begin to operate in accordance with the new configuration data.

Figure 4:
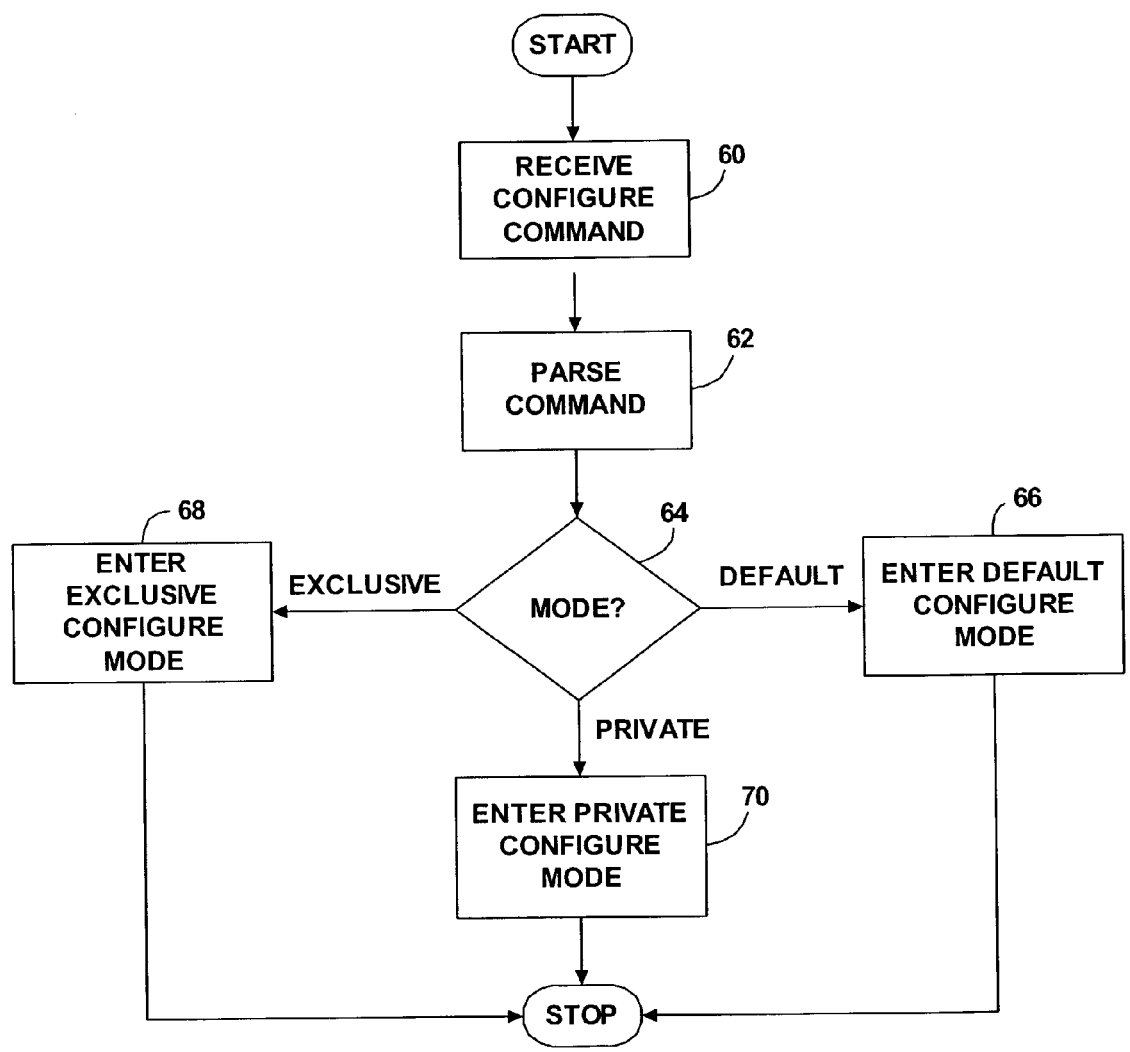
FIG. 4 is a flowchart illustrating a management module entering a configuration mode in response to a configure command from a client.

FIG. 4 is a flowchart illustrating management module 42 entering a configuration mode in response to a configure command from one of clients 20. Initially, management module 42 receives a command from one of clients 20 to configure router 24 (60). In response to receiving a configure command from one of clients 20, management module 42 may parse the command to determine which configuration mode to operate in (62, 64). When the configure command includes no additional parameters that specify a particular configuration mode, management module 42 operates in a default configure mode (66). In this mode, management module 42 allows clients 20 to concurrently edit shared database 50. If one of clients 20 issues a commit command, all of the changes, complete or incomplete, made by clients 20 may be committed to committed database 48.

When the configure command includes the additional parameter exclusive, management module 42 operates in an exclusive configure mode (68). In exclusive configuration mode, management module 42 allows only one of clients 20 to edit configuration data of shared database 50 at a time. Allowing only one client 20 at a time to edit shared database 50 may prevent interference between client 20 in the exclusive configure mode and other clients 20 in different configuration modes. When receiving a commit command from the client 20 in the exclusive configure mode, management module 42 copies shared database 50 to committed database 48.

When the configure command includes the additional parameter private, management module 42 operates in a private configure mode (70). In private configure mode multiple clients 20 may concurrently issue configuration commands to management module 42. In particular, for each of clients 20 that issues a configure private command, management module 42 creates a respective private database 52 from committed database 48 that stores the present configuration of the device. Management module 42 applies configuration commands from clients 20 to their respective private databases 52. Upon receiving a commit command from any given one of clients 20, management module 42 merges the committed database 48 into a temporary copy of the respective one of private database 52 being committed to generate a "configuration patch." In particular, management module 42 generates the patch to represent the changes to private database 52, i.e., the differences between the private database and the committed data source.

While operating in any of the configuration modes, management module 42 may also generate a configuration patch in response to a show|compare command received from one of clients 20. In a general sense, the show|compare command may be used to generate a configuration patch that lists the differences between an initial data source, e.g., committed database 48 or configuration text file 54, and a working copy of the initial data source, e.g., private database 52 or shared database 50. In response to the show|compare command, the management module creates a temporary copy of the working copy, and merges the initial data source into the working copy to generate the patch.

The management module "applies" the patch to update the initial data source, either automatically in response to the commit command or in response to a load patch command received from the client, to reconcile the initial data source with the working copy. For example, the load patch command may be used to reconcile committed database 48 with one of private databases 52. Alternatively, the load patch command may be used to reconcile committed database 48 with shared database 50. In one embodiment, management module 42 makes a temporary copy of the initial data source, e.g., committed database 48, and loads the patch into the temporary copy to apply the patch. If the load is successful, management module 42 replaces the initial data source with the temporary copy. When applying the patch, management module 42 resolves any conflicts that may exist between the working copy and any changes to the initial data source made by other users while the working copy was being edited.

Figure 5:
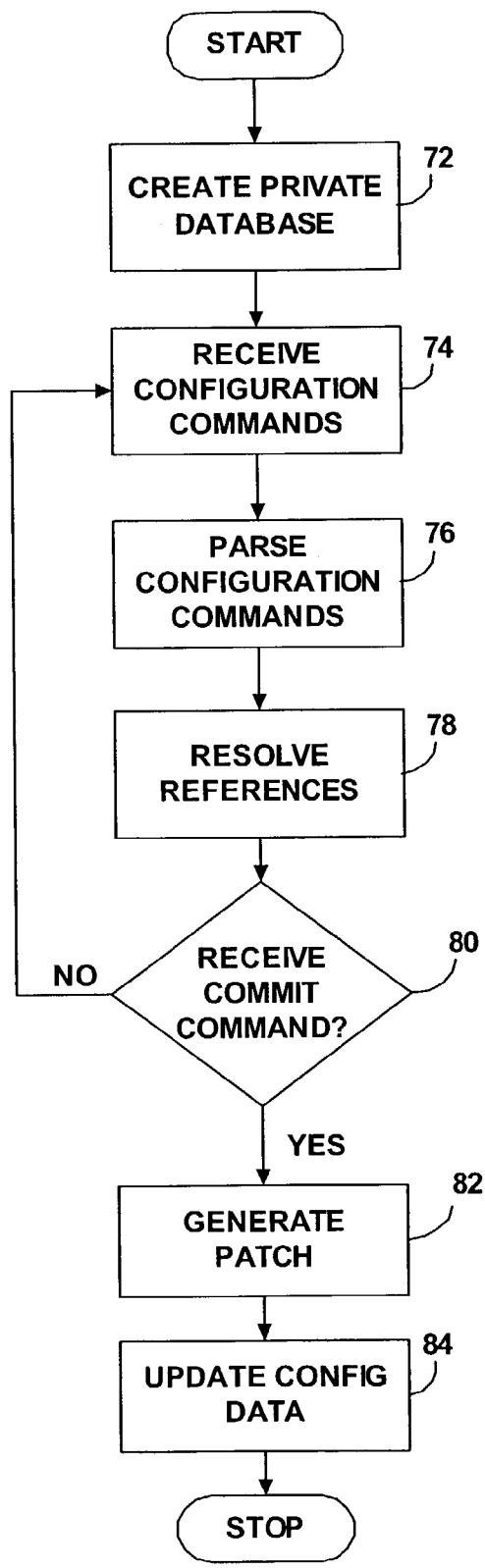
FIG. 5 is a flowchart illustrating a management module operating in a private configure mode in response to receiving a configure private command.

FIG. 5 is a flowchart illustrating management module 42 operating in a private configure mode in response to receiving a configure private command. In response, management module 42 creates a private database 52 for the requesting client 20 that issued the configure private command (72). As described, private database 52 may be a replicate of committed database 48 at the time the request is received. Alternatively, private database 52 may be a copy of configuration data in shared database 50. In addition, management module may make a corresponding copy of configuration text file 54, which may comprise an ASCII file, at the time of the request.

Next, client 20 may edit the configuration data of private database 52 by issuing one or more configuration commands to management module 42 (74). Private database 52 allows client 20 to edit data without interference from other clients 20 who may also be editing the configuration of router 24. For example, if client 20 issues a rollback command, the configuration data of the respective private database 52 may be updated with a current copy of configuration data from committed database 48. Meanwhile, the edited configuration data of a private database 52 associated with another one of clients 20 remains unchanged.

Management module 42 may parse the configuration commands input from client 20, and resolve the references to appropriately configure router 24 (76, 78). Management module 42 waits to receive a commit command that indicates the completion of editing of private database 52 (80). When a commit command has not been received from client 20, management module 42 continues to receive configuration commands. However, upon receiving a commit command, management module 42 generates a patch representing the changes to private database 52, and applies the patch to committed database 48 (82, 84). Once the configuration data of committed database 48 is updated, router 24 may begin to operate in accordance with the new configuration data.

Figure 6:
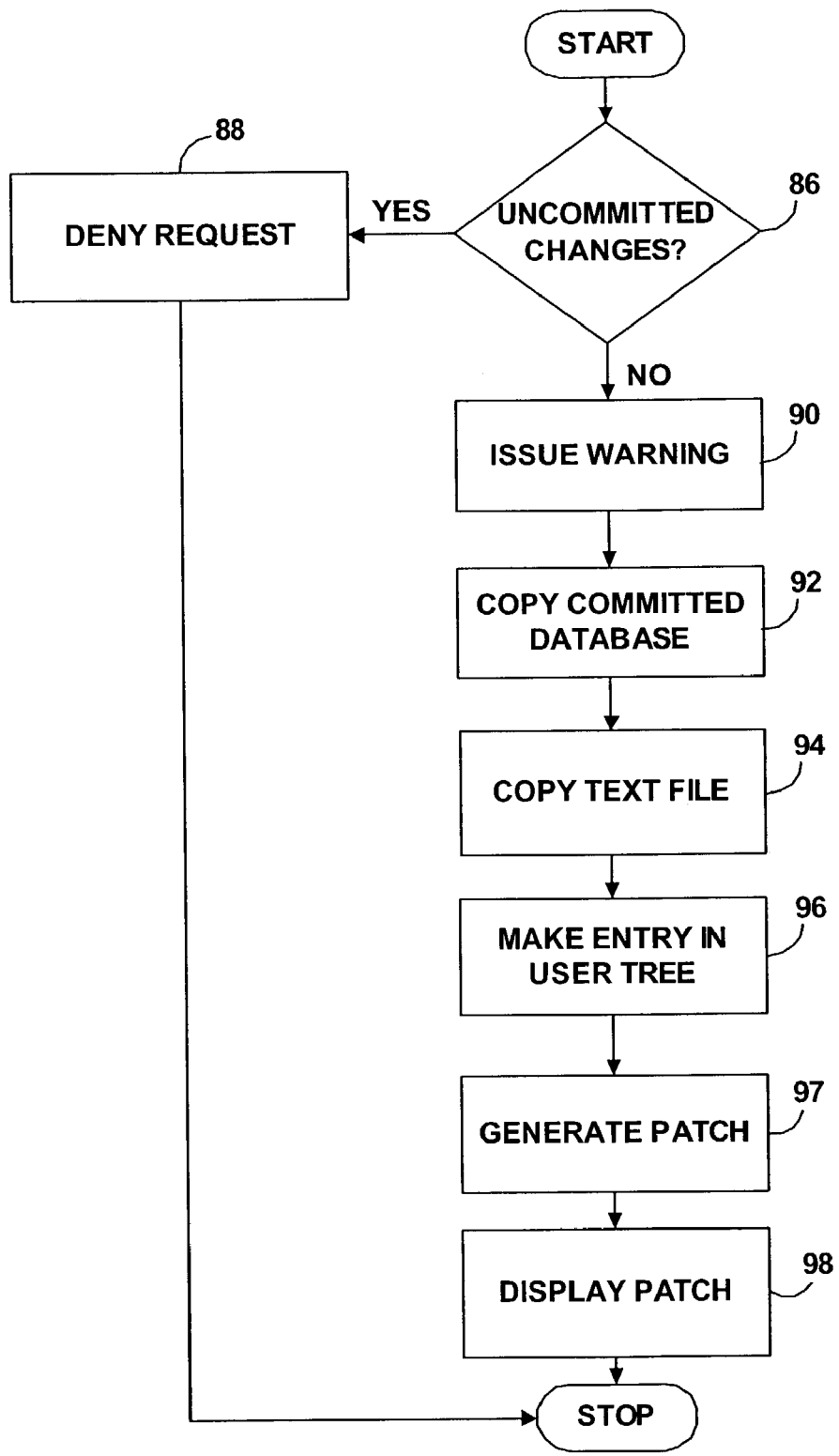
FIG. 6 is a flowchart illustrating a management module creating a private configuration database when operating in a private configure mode.

FIG. 6 is a flow chart illustrating management module 42 creating a private configuration database 52 when operating in a private configure mode. In response to receiving a configure private command, management module 42 verifies that shared database 50 does not contain any uncommitted changes (86). Shared database 50 may contain uncommitted changes if another one of clients 20 is in the process of editing configuration information. If shared database 50 contains uncommitted changes, management module 42 does not permit client 20 to enter into the private configuration mode. In that case, client 20 may need to wait until shared database 50 is unmodified before entering a private configure mode (88).

If shared database 50 does not contain any uncommitted changes, management module 42 may issue a warning to client 20 that any uncommitted changes to private database 52 will be discarded (90). Uncommitted changes may be discarded upon exiting private configuration mode, or on a time-out basis. For example, if client 20 leaves the private configuration mode unattended for more than ten minutes, management module 42 may discard private database 52 along with its changes. Alternatively, private configuration mode may not discard uncommitted changes. In that case, management module 42 may, for example, allow client 20 to enter a private configuration mode, make changes to the respective private database 52, and exit the private configuration mode without discarding the changes made by client 20. Client 20 may then enter a private configuration mode later to continue making changes to the respective private database 52.

Management module 42 copies the configuration data of committed database 48 to private database 52 (92). Furthermore, management module 42 may generate a copy of text file 54 that may contain configuration data used by management module 42 during restart. (94). An entry may be made in the user tree of shared database 50 indicating that a private configuration mode is in session (96). Client 20 may edit the configuration data of private database 52 by issue one or more configuration commands to add new settings to the current configuration of router 24, delete or modify existing settings of the current configuration, or combinations thereof. Client 20 may issue a show|compare command directing management module 42 to generate a patch listing the differences between the configuration data of private database 52 and the copy of text file 54 (97). Management module 42 may further display to client 20 the generated patch (98). Client 20 may save the patch, and load the patch at another time. For example, the pseudocode below illustrates the exemplary use of the show|compare command in accordance with the invention.

user@host> configure private
user@host # set system host-name Bob
user@host # show|compare
[edit system]
– host-name Fred
+ host-name Bob In the above pseudocode client 20 issues a configure private command directing management module to operate in a private configuration mode. While in the private configuration mode, client 20 then issues a command to modify the current host name of router 24, i.e., set system host-name. Finally, client 20 issues a show|compare command directing management module 42 to generate a patch. Management module 42 merges the edited configuration data of the respective private database 52 with the copy of text file 54 to generate a patch, and may display the patch to client 20 as shown above. The patch indicates that host name Fred, the current host name of the system, is being removed (hence the minus sign in front of it) and the host-name Bob is being added (the plus sign in front of it).

In this manner, the show|compare command displays the changes to the private database 52 against the most recently committed global configuration. The general syntax for the generated configuration patch can be expressed as follows:

[edit location]
leading context identifier;
± updated object;
± updated object;
trailing context identifier;

.
.
.

[edit location]
leading context identifier;
± updated object;
± updated object;
trailing context identifier;

As illustrated, the configuration patch identifies one or more "locations" within the configuration data that has been changed. In general, a location refers to a list or "container" of related configuration objects within the configuration data. For example, the location "interfaces" may contain one or more objects that describe configuration information for a respective interface.

Each modified location, e.g., container, is identified within the configuration patch by a header that list the name of the location. The header takes the form of [edit location], where location indicates the name of the location that has been changed. For an identified container, the configuration patch may include a leading context identifier that indicates the object within the container that immediately precedes the listed changes. Similarly, the configuration patch may include a trailing context identifier to indicate the object within the location that immediately follows the changed object. These identifiers may be used by management module 42 to precisely locate the point of change within the configuration data. More specifically, management module 42 examines the current objects within the configuration data being modified, and readily applies the changes of the configuration patch based on context identifiers to preserve any desired order of the configuration objects.

The configuration patch lists one or more objects to be changed between the leading context identifier and trailing context identifier, if present. Each object to be changed is preceded by a modification control indicator, e.g., a plus (+) or (−) sign. A plus sign, for example, indicates that the listed object is to be inserted, while a minus sign indicates the object is to be deleted. The following provides a more detailed example configuration patch generated in response to a show|compare command.

```
[edit   system]
 -          host-name edge1_router;
 +          host-name egde2_router;
[edit   system name-server]
            172.17.28.100;
 +          172.0.0.1;
[edit   system login]
 -      user remote {
 -          full-name "Radius/Jones authenticated";
 -          uid 21000;
 -          class superuser;
 -      }
[edit   system login]
 +      user template {
 +          full-name "Radius/Jones authenticated";
 +          uid 21000;
 +          class superuser;
 +      }
[edit   interfaces]
 +      at-2/2/2 {
 +          unit 0 {
 +              family inet {
 +                  address 192.168.1.1/32;
 +              }
 +          }
 +      }
[edit   policy-options]
        prefix-list peers { ... }
 +      prefix-list rfc3933{
 +          172.16.0.0/20;
 +      }
```

The above example configuration patch includes six (6) headers that identify the modification of six separate locations within the configuration data. The first header, [edit system], indicates that the location system is modified. The following lines indicate that within the system location the object host-name having a value of edge_router_1 is to be deleted, and the object host-name having a value of edge_router_2 is to be inserted.

The second header within the configuration patch, [edit system name-server], indicates that the location system name-server is modified to include the object 172.0.0.1 after an existing object of 172.17.28.100. In this manner, the object 172.17.28.1 operates as a leading context identifier to indicate the precise insertion point of the new object.

The third and fourth headers within the configuration patch, [edit system login], indicates that the location system login is modified. The text following the second header indicates that user remote location within the system login is to be completely deleted. The text following the third header indicates that the location user template is to be inserted. This portion of the example configuration patch may, for example, be a result of a configuration command to rename user remote within system login to user template.

Next, a new interface, at-2/2/2, is inserted within the location interfaces. Finally, the location policy-options is modified to include the object prefix-list refc1918 after an existing prefix-list peers object. In this manner, the object prefix-list peers operates as a leading context identifier to indicate the precise insertion point of the new object.

Although described in reference to the configuration of a private database 52 in response to a configure private command, the techniques for generation of a configuration patch are not so limited. In a general sense, the show|compare command may be used to generate a configuration patch that lists the differences between an initial data source and a working copy of the initial data source. In this manner, the show|compare command may be used with a shared data source within the network device editable by multiple clients, or with a private data source editable by a corresponding client in a private configuration mode.

Moreover, the techniques may be used to generate and distribute configuration patches to other network devices. A system administrator may use a single router, for example, as a central point for configuring a network having multiple routers. In particular, upon making one or more changes to the central router, the system administrator may generate a configuration patch using the show|compare command, and distribute the configuration patch to the other devices.

Figure 7:
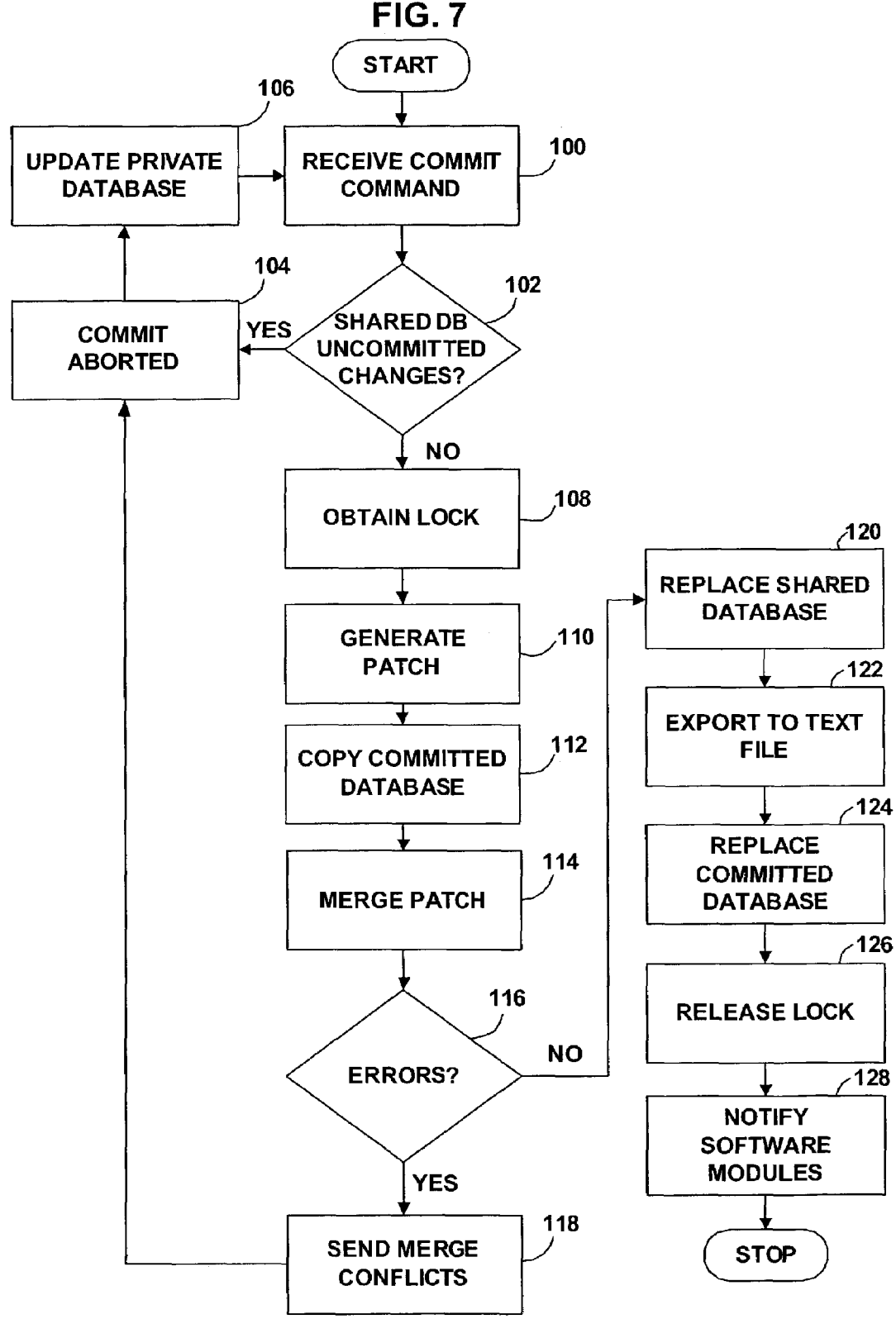
FIG. 7 is a flowchart illustrating a management module updating the configuration of a router in response to a commit command while in a private configuration mode.

FIG. 7 is a flow chart illustrating management module 42 updating the configuration of router 24 in response to a commit command while in a private configuration mode. Management module 42 receives a commit command from client 20 indicates the completion of editing configuration data of private database 52 (100). Management module 42 determines whether shared database 50 contains uncommitted changes (102). When shared database 50 contains uncommitted changes, the commit is aborted (104). Client 20 may wait until shared database 50 is no longer in the process of being edited, and issue an update command. The update command directs management module 42 to merge changes made by client 20 in private database 52 with a copy of the most recent committed database 48 (106). In this manner, the changes made to private database 48 by client 20 are not lost. Alternatively, management module 42 may automatically merge private changes made by client 20 with a copy of the most recent committed database 48 upon aborting a commit. Client 20 may review the changes to ensure correctness, and issue another commit command. Client 20 may also add or remove changes to private database 52 before issuing another commit command. Furthermore, client 20 may issue a rollback command, which discards changes made, and loads private database 52 with a fresh copy of committed database 48.

When shared database 50 does not contain uncommitted changes, management module 42 locks shared database 50 (108). The lock prevents other of clients 20 from editing shared database 50 while manage module 42 is responding to the commit command. Having locked shared database 50, management module 42 may proceed to generate a patch by merging the changes made to private database 52 with the copy of text file 54, as described above in reference to the show|compare command (110).

Upon generating the configuration patch, management module 42 may make a copy of committed database 48, and apply the patch to the copy of committed database 48 (112, 114). Management module 42 may apply the patch automatically in response to receiving the commit command, or in response to receiving a load patch command.

To apply the configuration patch, management module 42 parses the patch to identify the edit headers describing modified locations. For each header, management module 42 identifies the name of the modified location, and identifies the location within the configuration data being updated. For inserted objects, management module 42 examines any leading or trailing context identifiers specified in the patch to precisely locate a point of insertion. In this manner, management module 42 is able to identify a point within a configuration file or hierarchy for update.

Based on the modification control indicator preceding each object listed within the patch, e.g., a plus or minus sign, management module 42 applies the requested changes. If management module 42 detects a plus (+) sign preceding the objected listed within the patch, for example, the module inserts the listed object. Similarly, management module 42 deletes objects that have a proceeding minus (−) sign.

The general syntax for loading a configuration patch can be expressed as follows:

load patch filename where filename represents a file name storing a configuration patch generated by a show|compare command, as described above. In this manner, the load patch command may direct management module 42 to retrieve the configuration patch from a data file. The following example pseudocode illustrates the exemplary use of the load patch command and the show|compare command in accordance with the invention.

[edit]
user@host # load patch the.patch
load complete
[edit]
user@host # show|compare
[edit system]
− host-name Fred
+ host-name Bob Parts of the configuration data of committed database 48 not specified by the configuration patch remain unchanged. For example, if client 20 only changed the host name in private database 52 (shown in pseudocode above), the copy of committed database 48 would remain unchanged, except for the host name changing from Fred to Bob.

During the application of the patch, management module 42 verifies that the conditions specified by the patch are satisfied. In particular, management module 42 verifies that any specified leading or trailing context identifier is present and has the specified value. In addition, management module 42 verifies that the requested insertion of deletion of any listed objects is successfully completed. If any conditions fail, management module 42 may abort the application of the configuration patch. For some errors, however, management module 42 may allow the user to proceed, depending up on the severity of the detected error.

In addition, management module 42 may check to see if the copy of committed database 48 with the patch merged, referred to herein as the temporary configuration database, contains any errors (116). Errors may include merging conflicts or configuration data not conforming to schema 56. When the temporary configuration database does contain errors, a merge conflict may be sent to client 20, and the commit is aborted (118, 104). The merge conflict may indicate any errors that occurred in merging committed database 48 with the patch. The merge conflict may also indicate whether the temporary configuration database contains any conforming errors, such as semantic errors. In the case of a merge conflict, management module 42 may automatically update private database 48 to correct the conflict while still retaining any changes made by client 20 (106). Alternatively, client 20 may issue an update command in response to a merge conflict. The pseudocode below illustrates an exemplary use of the update command in accordance with the invention.

user@host> configure private
user@host# set system host-name Bob
user@host# show|compare
[edit system]
− host-name Fred
+ host-name Bob
user@host# commit
'host-name Roy'
statement does not match patch; 'Roy'!='Fred'
load complete (1 errors)
user@host# update
user@host# show|compare
[edit system]
− host-name Roy
+ host-name Bob In the above pseudocode, client 20 issues a configure private command directing management module to operate in a private configuration mode. While in the private configuration mode, client 20 then issues a command to modify the current host name of router 24, i.e., set system host-name, to Bob. Client 20 issues a show|compare command directing management module 42 to generate a patch. Management module 42 generates a patch and may display it to client 20 as shown above. The patch indicates that host name Fred, the current host name of the system in private database 52, is being removed and the host-name Bob is being added. However, upon client 20 issuing a commit command to direct router 24 to verify and accept the change, an indication reveals that an error has occurred. The error states that the current host name of committed database 48 is Roy, not Fred. Another one of clients 20 may have issued a commit changing the host name to from Fred to Roy after client 20 began the configure private session. Client 20 may direct management module 42 to load the changes made by client 20 into a new copy of committed database 48. Alternatively, management module 42 may automatically update private database 52 with a new copy of committed database 38 with changes loaded in. Upon issuing another show|compare command, the patch indicates that the host name will be changed from Roy to Bob.

When the temporary configuration database contains no errors, the configuration data of the temporary configuration database may be applied to the configuration data of shared database 50 (120). The configuration data of the temporary configuration database may further be exported to text file 56 and replaces the current information in text file 56 (122). Furthermore, the configuration data of temporary configuration database may replace the configuration data of committed database 48 (124). The configuration data being replaced in committed database 48 may be saved to allow a client 20 to issue a rollback. Upon completion of replacing configuration data in shared database 50, text file 54, and committed database 48, management module 42 releases the lock on shared database 50 (126).

Management module 42 notifies existing software modules 46 that an updated version of configuration data is located in committed database 48 (128). Software modules 46 retrieve the new configuration information from committed database 48 and router 24 begins to operate in accordance with the updated configuration data.

Figure 8:
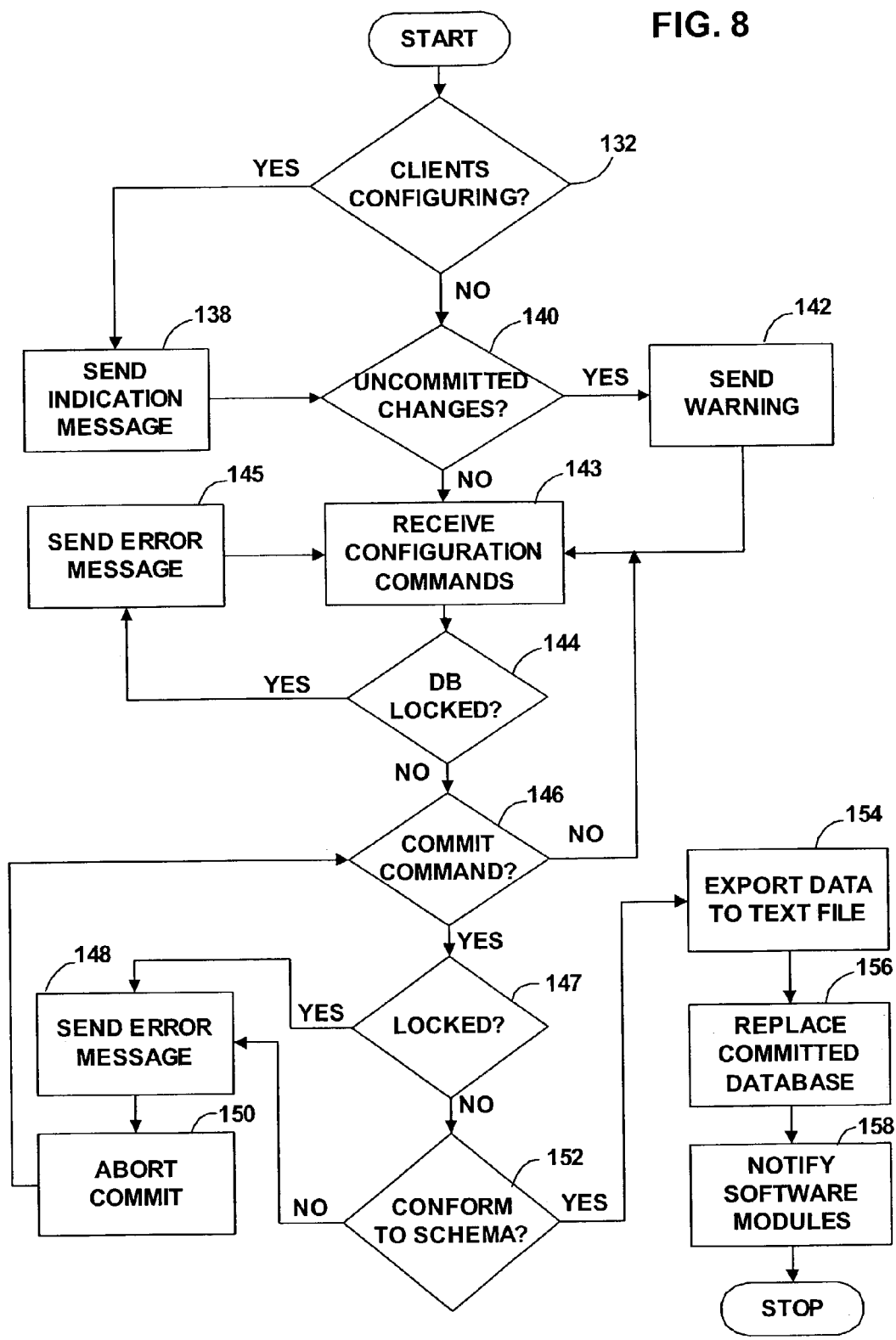
FIG. 8 is a flowchart illustrating a management module operating in a default configure mode in response to receiving a configure command.

FIG. 8 is a flow chart illustrating management module 42 operating in a default configure mode in response to receiving a configure command. In response to receiving a configure command that does not include additional parameters that specify a particular configuration mode, management module 42 determines whether other clients 20 are currently configuring router 24 (132). When other clients 20 are currently configuring router 24, management module 42 indicates to requesting client 20 a message to inform client 20 that there is currently another one of clients 20 configuring router 24 (138). The indication message may further inform client 20 the identity of other clients 20, the portion of configuration data that other clients 20 are viewing or editing, the time that other clients 20 logged into the configuration mode, and the like.

Upon sending the indication message to client 20, or if no other clients 20 are currently configuring router 24, management module 42 validates whether shared database 50 contains uncommitted changes (140). When shared database 50 contains uncommitted changes, a warning is sent to inform client 20 that there are uncommitted changes to shared database 36 (142). For example, the pseudocode below further illustrates these steps.

user@host> configure
Current configuration users:
user2 terminal p3 (pid 1088) on since 2002-05-14 01:02:27 CST
[edit interfaces so-3/0/0 unit 0 family inet]
The configuration has been changed but not committed
user@host>

In the above pseudocode, client 20 issues a configure command. Management module operates in a default configuration mode since the configure command contains no additional parameters indicating a specific configuration mode. Management module 42 indicates that another one of clients 20 is currently in the default configure mode. In the example above, only one other of clients 20, user2 at terminal p3 (pid 1088), is currently in the default configuration mode. User2 is editing interface so-3/0/0 unit 0 family inet. Management module 42 further warns client 20 that shared database contains uncommitted changes.

Once in the configure mode, management module 42 receives configuration commands from requesting client 20, and determines whether shared database 50 is locked (143, 144). Shared database 50 may be locked when another of clients 20 is in the exclusive configuration mode or committing changes in the private configuration mode. Requesting client 20 may continue issuing configuration commands as long as shared database 50 remains unlocked. When shared database 50 becomes locked, management module 42 forbids client 20 from issuing configuration commands. When client 20 attempts to issue configuration commands while shared database 50 is locked an error message is sent to client 20 indicating that another of clients 20 currently has a lock on shared database 50 (145).

Upon encountering a commit command (146), management module 42 determines whether any of clients 20 has a lock on shared database 50 (147). When one of clients 20 has a lock on shared database 50, management module 42 will inform client 20 of the lock another client 20 has on shared database 50 (148). The commit command issued by client 20 may be aborted (150). Client 20 may wait until the other client 20 releases the lock on shared database 50, and then issue another commit command. Alternatively, management module 42 may not abort the commit command issued by client, but instead management module may wait for the other client 20 to release the lock on shared database 50, and then proceed with the commit process.

When client 20 issues a commit command, all changes made to the configuration data of shared database 50, complete or incomplete, are committed. Furthermore, client 20 may issue a rollback command. The rollback command discards all the changes made to shared database 50, not just changes made by the issuer of the rollback command.

When shared database 50 is unlocked, management module 42 determines whether the updated configuration conforms to schema 56 (152). When the updated configuration does not conform to schema 56, management module 42 informs client 20 that configuration data does not contain semantically valid data, and aborts the commit command (148, 150). Management module 42 may further indicate where the error occurs in the configuration data. Client 20 may fix the errors and issue another commit command. Alternatively, management module 42 may automatically correct errors to the edited shared database 50. Client 20 may review the automatic error revisions and issue another commit command.

When the updated configuration conforms to schema 56, management module 42 may export the configuration data to text file 54 (154). Furthermore, the updated configuration data may replace the existing configuration data of committed database 48 (156). Management module 42 may save the replaced configuration data in committed database 48 to allow for clients 20 to issue a rollback command. Management module 42 notifies existing software modules 46 of the updated configuration data located in committed database 48 (158). Existing software modules 46 retrieve the updated configuration data from committed database 48 and router 24 begins to operate in accordance with the new configuration data.

FIG. 9 is a flowchart illustrating management module 42 operating in an exclusive configure mode in response to receiving a configure exclusive command. In response to a configure exclusive command, management module 42 determines whether any clients 20 are currently in an exclusive configuration mode (162). When another one of clients 20 is currently in the exclusive configuration mode, management module 42 informs client 20 that another one of clients 20 is in the exclusive configuration mode (164). Management module 42 may further inform client 20 of the identity of other clients 20, the portion of configuration data that other clients 20 are viewing or editing, the time that other clients 20 logged into the configuration mode, and the like. Client 20 may issue a logout command to forcibly log another one of clients 20 out of the exclusive configuration mode (166). When management module 42 does not receive a logout command, the request of client 20 to configure router 24 in the exclusive configuration mode is denied (168). In this manner, a syntax for the logout command may be expressed as follows:

request system log out [pid], where pid is the process identification of client 20 that is currently in the exclusive configuration mode.

When management module 42 receives a logout command from client 20, management module logs the other of clients 20 out of the exclusive configuration mode (170). After logging other clients 20 out, or if no other clients 20 are in the exclusive configuration mode, management module 42 places a lock on shared database 50 (172). Client 20 may edit the configuration data of shared database 50 without interference from any other of clients 20. Management module 42 may receive a commit command indicating the completion of editing shared database 50 (174). Management module 42, upon receiving a commit command from client 20, compares the updated configuration to schema 56 (176). When the updated configuration does not conform to schema 56 a management module 42 informs client 20 that there exists errors in the updated configuration, and aborts the commit (178, 180). Management module 42 may further indicate where the errors occur in the configuration information in order for client 20 to correct the errors. Alternatively, management module 42 may automatically correct the errors and display the corrections to client 20.

When the updated configuration conforms to schema 56, management module 42 exports the configuration data to text file 54 (182), and replaces the configuration data of committed database 48 with the updated configuration data (184). Further, management module 42 may save the configuration data being replaced to allow for a user to issue a rollback command. Management module 42 notifies existing software modules 46 of the updated configuration data in committed database 48 (186). Software modules 46 retrieve the updated configuration data from committed database 48.

A number of embodiments of the present invention have been described. Nevertheless, it will be understood that various modifications may be made without departing from the spirit and scope of the invention.

The invention claimed is:

1. A method comprising:
storing current configuration data for a network device in a first database on the network device;
providing a management interface to a plurality of clients via which the clients enter text-based commands;
receiving from each of a first portion of the plurality of clients a respective command that directs the network device to enter a first configuration mode specified by the command;
placing the network device in the first configuration mode specified by the command by creating a second database on the network device that stores a copy of the configuration data of the first database and allowing the first portion of the plurality of clients to access the second database and edit the configuration data of the second database simultaneously;
receiving from each of a second portion of the plurality of clients a respective command that directs the network device to enter a second configuration mode specified by the command;
placing the network device in the second configuration mode specified by the command by creating, for each of clients of the second portion of the plurality of clients, a respective private database on the network device that stores a copy of the configuration data of the first database and allowing the second portion of the plurality of clients to edit the respective private databases such that each of the private databases is edited by only one of the clients of the second portion of the plurality of clients; and
comparing the edited configuration data of the second database or one of the plurality of private databases to the configuration data of the first database to generate a configuration patch that lists any differences between the edited configuration data of the second database or one of the plurality of private databases and the configuration data of the first database.

2. The method of claim 1, wherein generating a configuration patch comprises:
creating a temporary copy of the second database or one of the plurality of private databases;
comparing the first database to the temporary copy to generate a list of updated configuration objects; and
generating the configuration patch that lists the updated configuration objects.

3. The method of claim 2, wherein generating the configuration patch includes generating the configuration patch to include context identifiers that indicate locations within the first database for the updated configuration objects.

4. The method of claim 3, wherein generating the configuration patch includes generating the configuration patch to include at least one of leading context identifiers to indicate locations prior to the updated configuration objects and trailing context identifiers to indicate locations subsequent to the updated configuration objects.

5. The method of claim 3, wherein the first database includes a data file having configuration objects, and the context identifiers indicate locations within the data file to preserve an order of the configuration objects.

6. The method of claim 1, further comprising generating the configuration patch in response to a command from a user to view the differences between the first database and the one of the second database or the private database associated with the user.

7. The method of claim 6, wherein the generating the configuration patch in response to a command from a user comprises generating the configuration patch in response to a show|compare command, the method further comprising displaying the patch to at least one of the plurality of clients without applying the patch to the configuration data of the first database.

8. The method of claim 1, further comprising:
receiving from one client of the first portion of the plurality of clients a respective command that directs the network device to enter a third configuration mode specified by the command;
placing the network device in the third configuration mode specified by the command by locking the second database on the network device and allowing the client from which the configuration command directing the network device to enter the third configuration mode was received to edit the configuration data of the second database.

9. The method of claim 8, wherein the third command comprises a configure exclusive command.

10. The method of claim 1, further comprising applying the configuration patch to the first database to update the configuration data of the first database in accordance with the differences.

11. The method of claim 1, further comprising:
storing the configuration patch as a file;
distributing the file containing the configuration patch to a second network device; and
in response to a command, loading the configuration patch from the file and applying the configuration patch to a database within the second network device.

12. The method of claim 1, wherein the configuration patch comprises a first configuration patch, the method further comprising comparing the other one of the second database and private database to the first database to generate a second configuration patch that lists any differences between the other one of the second database and private database and the first database.

13. The method of claim 1, wherein:
receiving from each of the first portion of the plurality of clients a respective command that directs the network device to enter a first configuration mode comprises receiving from each of the first portion of the plurality of clients a default configure command; and
receiving from each of the second portion of the plurality of clients a respective command that directs the network device to enter a second configuration mode specified by the command comprises receiving from each of the second portion of the plurality of clients a respective configure private command.

14. A network device comprising:
at least one interface card that couples to a network link; and
a control unit that couples to the at least one interface card, the control unit including:
a first database to store current configuration data for the network device;
a second database that stores a copy of configuration data of the first database, wherein a first portion of a plurality of clients edit the configuration data of the second database simultaneously;
at least one private database that stores a copy of the configuration data of the first data source, wherein only a single client of a second portion of the plurality of clients edits the configuration data of the private database; and
a management module that:
provides a management interface to a plurality of clients via which the clients enter text-based commands;
receives from each of the first portion of the plurality of clients a respective command that directs the network device to enter a first configuration mode specified by the command;
places the network device in the first configuration mode specified by the command by creating the second database and allowing the first portion of the plurality of clients to access the second database and edit the configuration data of the second database simultaneously;
receives from the single client of the second portion of the plurality of clients a respective command that directs the network device to enter a second configuration mode specified by the command;
places the network device in the second configuration mode specified by the command by creating the private database for the single client and allowing the single client to edit the private database such that the single client is the only one of the plurality of clients to edit the private database; and
compares the edited configuration data of the second database or the private database to the configuration data of the first database to generate a configuration patch that lists any difference between the edited configuration data of the second database or private database and the configuration data of the first database.

15. The network device of claim 14, wherein the management module generates the configuration patch by creating a temporary copy of the second database or the private database and comparing the first database with the temporary copy to generate a list of updated configuration objects.

16. The network device of claim 15, wherein the management module generates the configuration patch to include context identifiers that indicate locations within the first database for the updated configuration objects.

17. The network device of claim 16, wherein the management module generates the configuration patch to include at least one of leading context identifiers to indicate locations prior to the updated configuration objects and trailing context identifiers to indicate locations subsequent to the updated configuration objects.

18. The network device of claim 16, wherein the first database includes a data file having configuration objects, and the context identifiers indicate locations within the data file to preserve an order of the configuration objects.

19. The network device of claim 14, wherein the management module generates the configuration patch in response to a command from a user to view the differences between the first database and the one of the second database or the private database associated with the user.

20. The device of claim 19, wherein the management module:
generates the configuration patch in response to a show|compare command, and
displays the patch to at least one of the plurality of clients without applying the patch to the configuration data of the first database.

21. The network device of claim 14, wherein the management module creates a temporary copy of the one of the second database and the private database, compares the first database to the temporary copy of the one of the second database and the private database to generate a list of updated configuration objects; and generates the configuration patch that lists the updated configuration objects.

22. The network device of claim 21, wherein the management module generates the configuration patch to include context identifiers that indicate locations within the first database for the updated configuration objects.

23. The network device of claim 14, wherein the management module modifies the second database based on configuration commands received from the first plurality of clients and applies the configuration patch to the first database to update the first database in accordance with the differences.

24. The network device of claim 14, wherein the management module communicates the configuration patch to a second network device for application of the configuration patch to a database within the second network device.

25. The network device of claim 14, wherein the management module compares the first database to the one of the second database and the private database in response to a command to view the differences between the first database and the one of the second database and the private database.

26. The network device of claim 14, wherein the management module applies the configuration patch to the first database to update the first database in accordance with the differences.

27. The network device of claim 14, wherein the management module communicates the configuration patch to a second network device for application of the configuration patch to a database within the second network device.

28. The network device of claim 14, further comprising allowing the clients editing the second database to edit the same configuration data as the clients editing the third database.

29. The network device of claim 14, wherein:
the configuration patch comprises a first configuration patch that identifies differences between the second database and the first database, and
the management module, in response to a command issued by one of the clients, compares the third database to the first database to generate a second configuration patch that lists any differences between the third database and the first database.

30. The device of claim 14, wherein the management module:
receives from each of the first portion of the plurality of clients a respective default configure command that directs the network device to enter the first configuration mode; and receives from each of the second portion of the plurality of clients a respective configure private command that directs the network device to enter the second configuration mode.

31. The device of claim 14, wherein the management module:
receives from one client of the first portion of the plurality of clients a command that directs the network device to enter a third configuration mode specified by the command;
places the network device in the third configuration mode specified by the command by locking the second database on the network device and allowing the client from which the configuration command directing the network device to enter the third configuration mode was received to edit the configuration data of the second database.

32. A network device comprising:
at least one interface card that couples to a network link; and
a control unit that couples to the at least one interface card, the control unit including:
a first database to store current configuration data for the network device;
a second database to store a first copy of the configuration data of the first database, wherein the second database is a shared database that allows a plurality of clients to concurrently edit the configuration data of the second database using a shared configuration mode of the network device;
a third database to store a second copy of the configuration data of first database, wherein the third database is a private database that allows only a single client to edit the configuration data of the private database using a private configuration mode of the network device; and
a management module that, in response to a command issued by one of the clients, generates a configuration patch that lists any differences between the configuration data of the first database and the configuration data of the second database or the configuration data of the private database based on the configuration mode of the client that issued the command.

33. A method comprising:
storing current configuration data for a network device in a first database on the network device;
creating a second database on the network device that stores a copy of the configuration data of the first database;
allowing one or more clients to access the second database and edit the configuration data of the second database, wherein the second database comprises a shared database, and allowing one or more clients to edit the second database comprises allowing a plurality of clients to concurrently edit the configuration data of the second database simultaneously;
in response to a command from a user, comparing the edited configuration data of the second database to the configuration data of the first database to generate a configuration patch that lists any differences between the edited configuration data of the second database and the configuration data of the first database;
storing the configuration patch as a file;
distributing the file to a second network device; and
in response to a command, loading the configuration patch from the file and applying the configuration patch to a database within the second network device to update the database of the second network device in accordance with the differences listed in the configuration patch.

* * * * *